(12) United States Patent
Suciu et al.

(10) Patent No.: US 9,909,504 B2
(45) Date of Patent: Mar. 6, 2018

(54) GAS TURBINE ENGINE WITH COOLING SCHEME FOR DRIVE GEAR SYSTEM AND PITCH CONTROL

(71) Applicant: United Technologies Corporation, Hartford, CT (US)

(72) Inventors: Gabriel L. Suciu, Glastonbury, CT (US); Alan H. Epstein, Lexington, MA (US); Wesley K. Lord, South Glastonbury, CT (US); Jesse M. Chandler, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 320 days.

(21) Appl. No.: 14/440,953

(22) PCT Filed: Feb. 20, 2013

(86) PCT No.: PCT/US2013/026807
§ 371 (c)(1),
(2) Date: May 6, 2015

(87) PCT Pub. No.: WO2014/092750
PCT Pub. Date: Jun. 19, 2014

(65) Prior Publication Data
US 2015/0300265 A1    Oct. 22, 2015

Related U.S. Application Data

(60) Provisional application No. 61/736,858, filed on Dec. 13, 2012.

(51) Int. Cl.
*F02C 7/052* (2006.01)
*F02C 7/36* (2006.01)
(Continued)

(52) U.S. Cl.
CPC ............ *F02C 7/36* (2013.01); *B64D 33/02* (2013.01); *B64D 33/10* (2013.01); *F02C 7/052* (2013.01);
(Continued)

(58) Field of Classification Search
CPC . F02C 7/36; F02C 7/052; B64D 33/02; B64D 33/10; B64D 2033/022;
(Continued)

(56) References Cited

U.S. PATENT DOCUMENTS 2,752,111 A * 6/1956 Schairer .................. F02C 7/047
244/57
4,446,696 A    5/1984 Sargisson et al.
(Continued)

OTHER PUBLICATIONS

International Preliminary Report on Patentability for PCT Application No. PCT/US2013/026807, dated Jun. 25, 2015.
(Continued)

*Primary Examiner* — Richard Edgar
(74) *Attorney, Agent, or Firm* — Carlson, Gaskey & Olds, P.C.

(57) ABSTRACT

A gas turbine engine comprises an outer nacelle. A nose cone is spaced radially inward of the outer nacelle. The nose cone defines a particle separator for directing an outer air flow and an inner airflow. The inner airflow is directed through a core inlet to a compressor. The engine further comprises a drive gear system for driving at least one propeller. A variable pitch control system may alter a pitch angle of the at least one propeller. Some of the outer air flow is directed to at least one of the drive gear system and the pitch control system.

20 Claims, 2 Drawing Sheets

(51) Int. Cl.
*B64D 33/02* (2006.01)
*B64D 33/10* (2006.01)

(52) U.S. Cl.
CPC .. *B64D 2033/022* (2013.01); *F05D 2220/324* (2013.01); *F05D 2220/325* (2013.01); *F05D 2250/44* (2013.01); *F05D 2260/20* (2013.01); *Y02T 50/675* (2013.01)

(58) Field of Classification Search
CPC ......... F05D 2220/324; F05D 2220/325; F05D 2250/44; F05D 2260/20; Y02T 50/675
See application file for complete search history.

(56) References Cited

U.S. PATENT DOCUMENTS

| | | | |
|---|---|---|---|
| 4,546,605 A * | 10/1985 | Mortimer | F02C 7/14 184/6.11 |
| 4,881,367 A | 11/1989 | Flatman | |
| 4,887,424 A * | 12/1989 | Geidel | F02C 7/14 416/170 R |
| 6,482,881 B1 | 11/2002 | Shibata et al. | |
| 7,284,953 B2 | 10/2007 | Silverman et al. | |
| 7,326,031 B2 | 2/2008 | O'Neill et al. | |
| 7,475,549 B2 | 1/2009 | Alexander et al. | |
| 7,891,163 B2 * | 2/2011 | Richards | F02C 7/052 60/226.1 |
| 7,967,554 B2 | 6/2011 | Bremer | |
| 8,176,720 B2 | 5/2012 | Beeck | |
| 2005/0126181 A1 | 6/2005 | Wilson et al. | |
| 2008/0253881 A1 | 10/2008 | Richards | |
| 2012/0079808 A1 | 4/2012 | Glynn et al. | |
| 2012/0159961 A1 | 6/2012 | Krautheim et al. | |
| 2012/0207594 A1 | 8/2012 | Chanez et al. | |
| 2012/0237332 A1 | 9/2012 | Bulin et al. | |

OTHER PUBLICATIONS

International Search Report for corresponding PCT/US2013/026807.
Extended European Search Report for European Application No. 13861588.5, dated Dec. 14, 2015.

* cited by examiner

GAS TURBINE ENGINE WITH COOLING SCHEME FOR DRIVE GEAR SYSTEM AND PITCH CONTROL

CROSS-REFERENCE TO RELATED APPLICATION

This application claims priority to U.S. Provisional Application No. 61/736,858, filed on Dec. 13, 2012.

BACKGROUND

This application relates to a gas turbine engine, wherein discharge air from an inlet particle separator provides the ability to cool at least one of a drive gear system and a variable pitch control system.

Gas turbine engines are known, and include a compressor compressing air and delivering it into a combustor section. The air is mixed with fuel in the combustor and ignited. Products of the combustion pass downstream over turbine rotors driving them to rotate.

One type of gas turbine engine is a contra-rotating turbo prop gas turbine engine. In such a gas turbine engine, air may be delivered into a compressor section, as mentioned above from an inlet. The air may include impurities and, thus, it is known to include an inlet particle separator which will tend to force dirt or other impurities radially outwardly, such that clean air is delivered into the compression section.

Contra-rotating turbo prop engines may include a drive gear system, which is used to drive the propellers. These engines may also include a variable pitch control system for varying the pitch angle of the propeller blades. A contra-rotating turbo prop gas turbine engine may have a ducted exhaust through a propeller hub that inherently heats the drive gear system and variable pitch control system.

SUMMARY

In a featured embodiment, a gas turbine engine has an outer nacelle. A nose cone is spaced radially inward of the outer nacelle, and defines a particle separator for directing an outer air flow and an inner airflow. The inner airflow is directed through a core inlet to a compressor. A drive gear system drives at least one propeller. A variable pitch control system alters a pitch angle of the at least one propeller. Some of the outer air flow is directed to at least one of the drive gear system and the pitch control system.

In another embodiment according to the previous embodiment, an inner nacelle is radially inward of the outer nacelle. The inner nacelle provides a passageway for routing the outer air flow to the at least one fan drive gear system and the pitch control.

In another embodiment according to any of the previous embodiments, the passageway routes the outer air flow from an opening in a front lip of the inner nacelle.

In another embodiment according to any of the previous embodiments, a compressor bleed station selectively routes compressor bleed fluid from the compressor bleed station to the at least one fan drive gear system and the pitch control.

In another embodiment according to any of the previous embodiments, a control valve controls compressor bleed fluid flow from the compressor bleed station to the passageway.

In another embodiment according to any of the previous embodiments, the control valve is closed when ram air is available.

In another embodiment according to any of the previous embodiments, the nose cone has a radially outermost portion which is radially outward of a radially inner end of the core inlet, and such that air having heavier particles is generally directed radially outwardly of the core inlet.

In another embodiment according to any of the previous embodiments, an outer duct receives a portion of the outer air flow. The outer duct has a heat exchanger cooled by the portion of the outer air flow.

In another embodiment according to any of the previous embodiments, some of the outer air flow is directed to both the drive gear system and the pitch control system.

In another featured embodiment, a method providing a flow of fluid within a gas turbine engine includes providing a nose cone spaced radially inward of an outer nacelle. The nose cone directs an inner airflow through a core inlet. An outer air flow directs at least one of a drive gear system and a pitch control system.

In another embodiment according to any of the previous embodiments, compressor bleed fluid is selectively routed from a compressor bleed station to at least one of the fan drive gear system and the pitch control system.

In another embodiment according to any of the previous embodiments, a valve is opened to establish fluid flow from the compressor bleed station to at least one of a fan drive gear system and a pitch control system.

In another embodiment according to any of the previous embodiments, the valve is closed to deter fluid flow from the compressor bleed station through the passageway.

These and other features of the present disclosure can be best understood from the following drawings and detailed description.

BRIEF DESCRIPTION OF THE DRAWINGS

The drawings can be briefly described as follows.

DETAILED DESCRIPTION

Figure 1:
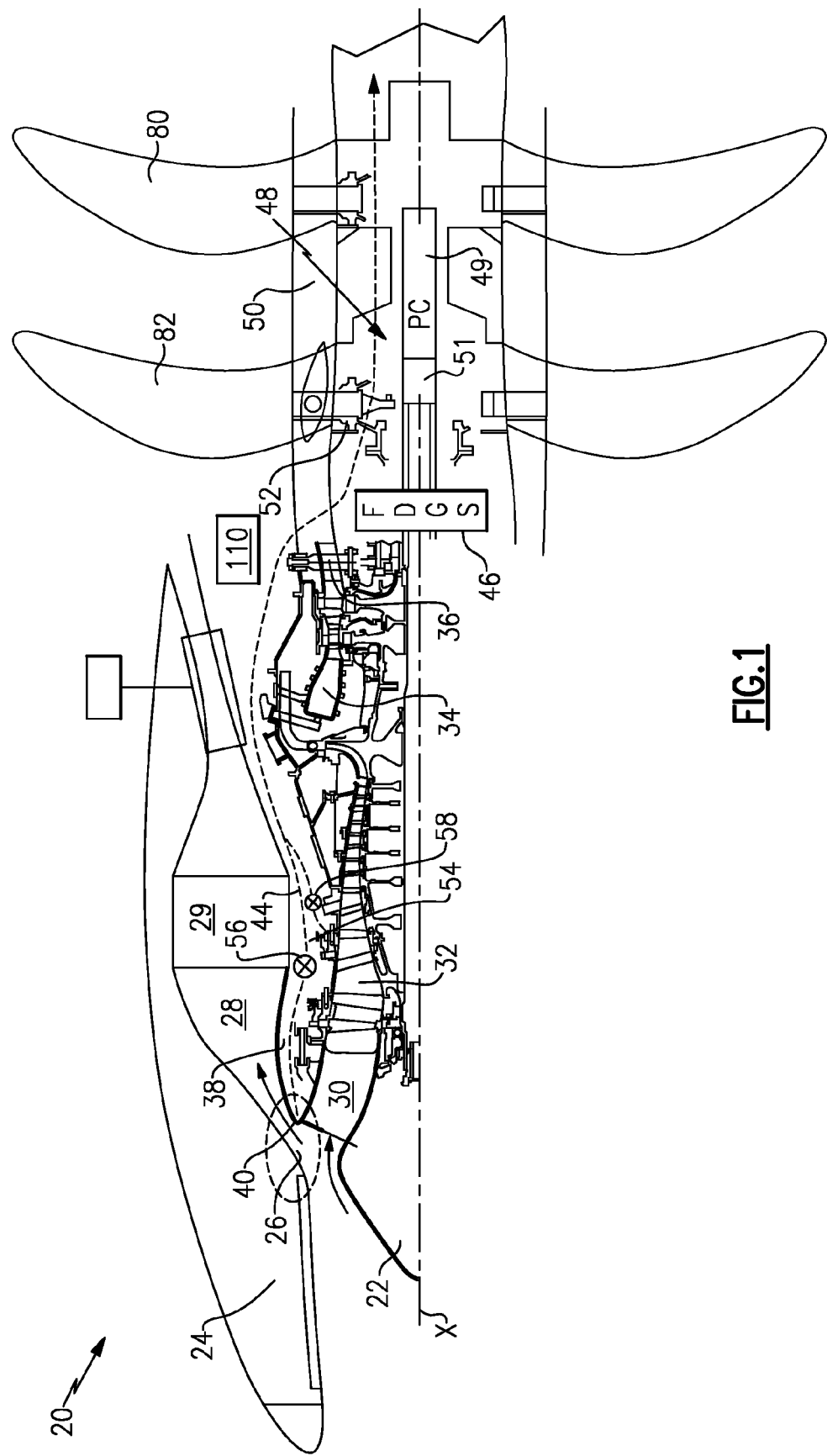
FIG. 1 schematically shows a gas turbine engine incorporating a passageway for routing fluid to the drive gear system and the variable pitch control modules.

A gas turbine engine 20 is illustrated in FIG. 1 having a nose cone 22 at an inlet end. Nose cone 22 is positioned radially inwardly of an outer nacelle 24. As shown, air passing the nose cone 22 may enter an inlet 26 of a manifold 28 and may be directed across a heat exchanger 29. The heat exchanger 29 may be associated with cooling any fluid of the engine. As one example, the heat exchanger 29 may cool oil which is delivered to a gear reduction associated with the gas turbine engine 20.

The nose cone 22 is designed to ensure the dirtier air will be delivered into the inlet 26, and the clean air passes into a path into a core inlet 30. Thus, the nose cone 22 acts as a particle separator. Core inlet 30 feeds air into a compressor section 32, where it is compressed and delivered into a combustor section 34. The air is mixed with fuel and ignited, and products of this combustion pass downstream over turbine rotors 36, driving them to rotate. The engine 20 may be a contra-rotating prop aircraft with a pair of propellers 80 and 82 rotating in opposed directions. The propellers 80 and 82 are driven by an output shaft of a drive gear system 46, which in turn is powered by the turbine section 36. Of course, other engine types may benefit from this disclosure.

The engine 20 further comprises an inner nacelle 38, radially inward of the outer nacelle 24 and downstream of the nose cone 22. Inner nacelle 38 may also be referred to as a "cowl," but will be referred to as inner nacelle 38 herein. A front lip 40 of the inner nacelle 38 is located between the inlet 26 and the core inlet 30.

As illustrated schematically in FIG. 1, inner nacelle 38 may provide a passageway 44 for the routing of fluid to the drive gear system 46 and the variable pitch control system 48. The variable pitch control system 48 may include, but is not limited to, a pitch controller 49, an actuator 51, and a pitch change mechanism 52. The actuator 51, controlled by the controller 49, drives the pitch change mechanism 52 to vary a pitch angle of the propellers 80, 82. The operation of the pitch control system may be generally as known. Of course, other pitch control systems may benefit from this disclosure.

Figure 2:
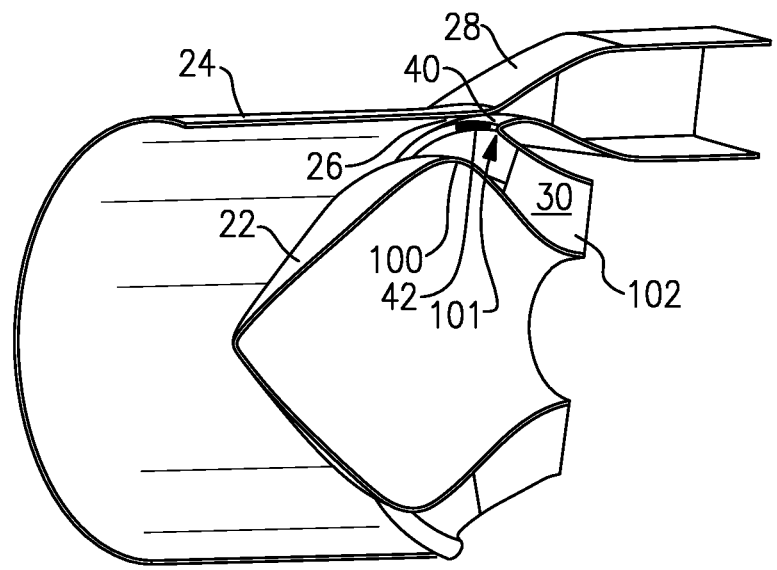
FIG. 2 is a detail of the inlet end of the gas turbine engine

FIG. 2 shows a detail of the nose cone 22. Nose cone 22 is shaped such that it has the highest or most radially outward point 100 which is radially further outward than an inner point 101 of a manifold 102 leading into the compressor 32. As is known, the gas turbine engine rotates upon an axis x (FIG. 1) and the "radially outward" position is relative to the axis x. Of course, some impurities or dirt may still be delivered into the core inlet 30. However, due to the shape and positioning of the nose cone 22, the heavier particles containing impurities are generally directed radially outwardly of the core inlet 30, and into the inlet 26 of the manifold 28. That is, the majority of the impurities will be passed into the manifold 28, compared to what is passed into the core inlet 30.

Figure 3:
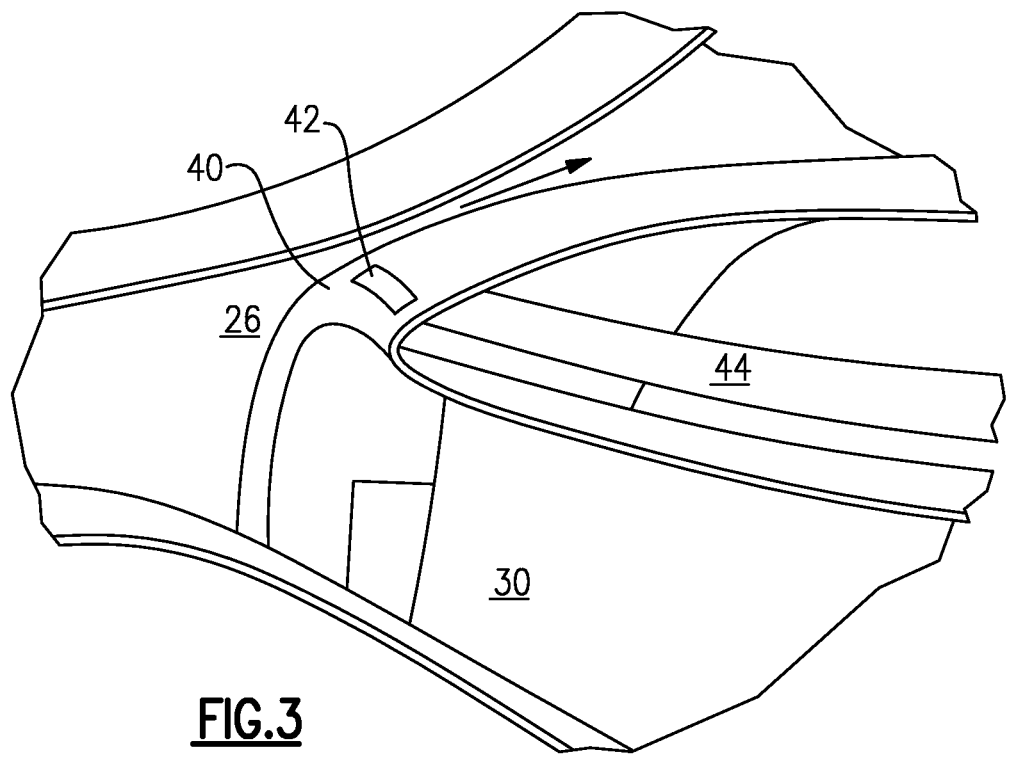
FIG. 3 is a detail of the opening on the front lip of the inner nacelle and an example embodiment of the passageway.

FIG. 3 illustrates schematically an enlarged view of the front lip 40 of inner nacelle 38. The front lip 40 includes an opening 42 for receiving discharge air from the particle separator into a passageway 44. FIG. 3 illustrates an example embodiment of passageway 44. However, one of ordinary skill would realize that the passageway 44 is not limited to one embodiment. One of ordinary skill in the art would understand that multiple openings and multiple passageways could be used.

In one embodiment, the fluid routed through passageway 44 will be directed to cool the fan drive gear system 46 and variable pitch control system 48. This cooling may prevent damage to the drive gear system 46 and the variable pitch control system 48 caused by the inherent heat from the exhaust in duct 50. The fluid may then be vented to ambient. Of course, other components in a gas turbine engine may be cooled in this manner.

The gas turbine engine 20 may further comprise a compressor bleed station 54 located at the compressor 32. The compressor bleed station 54 may provide a port to the passageway 44 to allow compressor bleed fluid to be routed through the passageway 44 to the drive gear system 46 and the variable pitch control system 48. The passageway 44 may further include a first control valve 56 for controlling the fluid flow from inner nacelle opening 42. A second valve 58 may be included for controlling the fluid flow from the compressor bleed station 54.

With the control valves 56, 58 included in the passageway 44, the source of fluid through the passageway 44 can be controlled by a control 110, shown schematically. In one instance the first control valve 56 is opened to establish fluid flow from the opening 42 in the front lip of the inner nacelle through the passageway 44 to the drive gear system 46 and the variable pitch control system 48. The second control valve 58 may then be closed to deter fluid flow from the compressor bleed station through the passageway. This may be performed during flight conditions when forward velocity generates enough ram air to create a substantial amount of dynamic pressure in the passageway 44.

In another instance, the second control valve 58 is opened to establish compressor bleed fluid flow from a compressor bleed station 54 through the passageway 44 to at least one of the drive gear system 46 and the variable pitch control system 48. The first control valve 56 may then be closed to deter fluid flow from the opening 42 in the front lip of the inner nacelle through the passageway 44 to at least one of the drive gear system 46 and the variable pitch control system 48. This may be performed during a ground idle state when inlet ram air is not available.

Further disclosed is a method for providing a flow of fluid within a gas turbine engine. A flow of fluid is established through a passageway 44 provided by an inner nacelle 38. The passageway 44 routes fluid to the drive gear system 46 and variable pitch control system 48. The passageway 44 may route fluid from an opening 42 in the front lip 40 of the inner nacelle 38. A compressor bleed station 54 may also be included in the engine to route compressor bleed fluid from the compressor bleed station 54 through the passageway 44.

The method may further include the ability to select a fluid source using control valves 56, 58. In one instance, the opening 42 in front lip 40 of the inner nacelle 38 may be selected as the fluid source by opening a first valve 56 to establish fluid flow from an opening 42 in the front lip 40 of the inner nacelle through the passageway 44. The fluid may be routed through the passageway 44 to the drive gear system 46 and variable pitch control system 48. The second valve 58 may then be closed to deter compressor bleed flow from the compressor bleed station 54 through the passageway 44. The opening 42 in the front lip 40 of the inner nacelle 38 may be selected as a fluid source during flight conditions when forward velocity generates enough ram air to create a substantial amount of dynamic pressure in the passageway 44.

In another instance, the compressor bleed station 54 may be selected as the fluid source by opening the second valve 58 to establish compressor bleed fluid flow from the compressor bleed station 54 through the passageway 44. The fluid may then flow through the passageway 44 to the drive gear system 46 and variable pitch control system 48. The first valve 56 may then be closed to deter fluid flow from the opening 42 in the front lip 40 of the inner nacelle 38 through the passageway 44. The compressor bleed station 54 may be selected as a fluid source during a ground idle state when inlet ram air is not available.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:
1. A gas turbine engine comprising:
an outer nacelle;
a nose cone spaced radially inward of the outer nacelle, the nose cone defining a particle separator for directing an outer air flow and an inner airflow, the inner airflow directed through a core inlet to a compressor;

a drive gear system for driving at least one propeller;

a variable pitch control system for altering a pitch angle of the at least one propeller; and wherein some of the outer air flow is directed to at least one of the drive gear system and the pitch control system.

2. The gas turbine engine of claim 1, including an inner nacelle radially inward of the outer nacelle, the inner nacelle providing a passageway for routing the outer air flow to said at least one of the drive gear system and the pitch control system.

3. The gas turbine engine of claim 2, wherein the passageway routes the outer air flow from an opening in a front lip of the inner nacelle.

4. The gas turbine engine of claim 3, wherein some of the outer air flow is directed to the pitch control system.

5. The gas turbine engine of claim 3, comprising a pair of propellers, wherein the opening is forward of the pair of propellers.

6. The gas turbine engine of claim 3, wherein the front lip separates the core inlet from a second inlet to a manifold.

7. The gas turbine engine of claim 3, further comprising a compressor bleed station, the compressor bleed station selectively routing compressor bleed fluid from the compressor bleed station to said at least one of the drive gear system and the pitch control system.

8. The gas turbine engine of claim 7, including a control valve for controlling compressor bleed fluid flow from the compressor bleed station to the passageway.

9. The gas turbine engine of claim 8, including a second control valve for controlling air flow from the opening to the passageway.

10. The gas turbine engine of claim 8, wherein the control valve is closed when ram air is available.

11. The gas turbine engine of claim 1, wherein the nose cone has a radially outermost portion which is radially outward of a radially inner end of the core inlet, and such that air having heavier particles is generally directed radially outwardly of the core inlet.

12. The gas turbine engine of claim 1 including an outer duct receiving a portion of the outer air flow, and the outer duct having a heat exchanger cooled by the portion of the outer air flow.

13. The gas turbine engine of claim 1, wherein some of the outer air flow is directed to both the drive gear system and the pitch control system.

14. A method for providing a flow of fluid within a gas turbine engine comprising:

providing a nose cone spaced radially inward of an outer nacelle, the nose cone separating an inner airflow from an outer airflow and directing the inner airflow through a core inlet; and directing some of the outer air flow to at least one of a drive gear system and a pitch control system.

15. The method of claim 14, further including the step of selectively routing compressor bleed fluid from a compressor bleed station to said at least one of the drive gear system and the pitch control system.

16. The method of claim 15, further including the step of opening a valve to establish fluid flow from the compressor bleed station to said at least one of the drive gear system and the pitch control system.

17. The method of claim 16, further including the step of closing the valve to deter fluid flow from the compressor bleed station to said at least one of the drive gear system and the pitch control system.

18. The method of claim 14, wherein the some of the outer air flow is directed to both of the drive gear system and the pitch control system.

19. The method of claim 14, wherein the some of the outer air flow is directed to the pitch control system.

20. The method of claim 14, comprising providing an opening in a front lip of an inner nacelle radially inward of an outer nacelle; and directing the some of the outer air flow through the opening to at least one of a drive gear system and a pitch control system.

* * * * *